United States Patent Office 2,968,566
Patented Jan. 17, 1961

2,968,566
COMPOSITION USEFUL WITH COMESTIBLES

James C. Munch, Lansdowne, Pa., assignor to Pharmacodynamics, Inc., Philadelphia, Pa.

No Drawing. Filed Jan. 7, 1959, Ser. No. 785,336

7 Claims. (Cl. 99—143)

This invention is that a sodium-free yet saline tasting composition of matter useful as a condiment with comestibles, as a substitute for table salt. It is applicable in the preparation, culinary treatment, and saline flavoring, of comestibles, particularly for persons requiring a so-called "salt-free" diet, for example, those having cardiac and/or vascular ailments.

The shalt substitute of this invention has potassium chloride as its highest content constituent and a non-sodium gluconate as the next higher, together with smaller amounts of potassium citrate and of ascorbic acid and/or calcium ascorbate, and a very small amount of a synthetic sweetening agent such as calcium cyclamate and/or saccharin. This salt substitute may also include glutamic acid and/or calcium glutamate usually to less than about the minimum for the total gluconate content. Improved utility occurs by including up to about one-quarter of a percent by weight of thiamin hydrochloride or nitrate.

Many attempts have been made to provide saline tasting compositions as a substitute for table salt in trying to overcome the general lack of palatability of the "salt-free" diets. Perhaps more of these substitutes use ammonium chloride as the primary ingredient than any other substance, with those using primarily potassium chloride possibly coming next, and then followed by those using primarily both of these substances.

Each of these two chlorides, and particularly their joint use, leaves much to be desired as to taste. Neither of them tastes like sodium chloride. Each alone gives a disagreeable taste, and so also do both taken together, with resulting tendency to discourage continued voluntary use. Potassium chloride usually leaves a somewhat bitter after-taste. Ammonium chloride has a bitter taste, and disturbs the acid-base balance in the blood, and produces acidosis. It stimulates the bronchial mucosa, causes mucous secretion and promotes coughing. Ammonium chloride decomposes with liberation of ammonia at cooking and baking temperatures, with accompanying change in taste and with the released hydrogen chloride changing the acidity and other properties of the foods. Other ingredients considered from time to time have not overcome the bitter after-taste of potassium chloride, nor produced a salt substitute with a suitable saline taste, and have manifested unpleasant side effects and other physiological drawbacks as to restrict their usability in cooking as well as on foods at the time they are going to be eaten.

These disadvantages and shortcomings are avoided by the sodium-free yet good saline tasting salt substitute compositions of the invention. These, considered broadly, contain by weight from about forty-five to about ninety parts of potassium chloride, from about four and one-half parts to about twenty-three and one-half parts of potassium gluconate, from about four and one-half to about twenty-one and one-half parts calculated as calcium gluconate of it and/or gluconic acid, from about five to about sixteen parts of potassium citrate, from about four to about fifteen parts calculated as calcium ascorbate of it and/or ascorbic acid, and from about 0.001 to about 0.02 percent of calcium cyclamate which could be replaced in whole or in part by saccharin in the range of ten times that for the calcium cyclamate, or saccharin soluble (i.e. the sodium sulfonate) in the range of one-tenth that for the calcium cyclamate.

Any of the compositions within the foregoing ranges of proportions, and others referred to below, are prepared by commonly used methods of granulation merely from mixtures of the several ingredients, preferably initially conveniently smaller than forty mesh. Such starting mixtures are wetted in known manner, granulated, and their granulations dried as usual and screened to give a product about the usual size of common table salt, for example, by taking the fraction passing through the thirty mesh screen and retained on the forty mesh screen. The product is non-hygroscopic, free running and elegantly similar to sodium chloride in taste and flavor.

Other embodiments of the invention include from about one to about nine and one-quarter parts calculated as calcium glutamate of it and/or glutamic acid. Still further embodiments include from about one-fifth to about one-quarter percent of thiamin hydrochloride or its equivalent as its nitrate or other water-soluble thiamin salt, with even enhancement of the saline taste.

The compositions of the invention are illustrated by, but not restricted to, the following examples, wherein all parts are by weight:

Example 1

| | Parts |
|---|---|
| Potassium chloride | 70.73 |
| Potassium gluconate | 7.5 |
| Calcium gluconate | 7.5 |
| Potassium citrate | 6.5 |
| Calcium ascorbate | 7.5 |
| Thiamin hydrochloride | 0.25 |
| Calcium cyclamate | 0.02 |

Example 2

| | |
|---|---|
| Potassium chloride | 70.8 |
| Potassium gluconate | 7.5 |
| Calcium gluconate | 7.5 |
| Potassium citrate | 6.5 |
| Calcium ascorbate | 7.5 |
| Saccharin | 0.2 |

Example 3

| | |
|---|---|
| Potassium chloride | 70 |
| Potassium gluconate | 7 |
| Calcium gluconate | 5.98 |
| Potassium citrate | 6 |
| Calcium glutamate | 5 |
| Calcium ascorbate | 5.75 |
| Thiamin nitrate | 0.25 |
| Calcium cyclamate | 0.02 |

In any of the Examples 1, 2 and 3, the calcium gluconate can be replaced in part or as a whole by the equivalent amount of gluconic acid, and the calcium ascorbate similarly can be replaced by its equivalent amount of ascorbic acid. The latter replacement is preferred in Example 3 where the resulting reduction in calcium content is compensated by the quantity of it added by the calcium glutamate. The saccharin in Example 2 can be replaced in part or as a whole by its equivalent in sweetening capacity of saccharin soluble and/or sodium, potassium, magnesium or calcium cyclamate. Similarly, the latter in Examples 1 and 3 can be replaced by its equivalent of either saccharin in sweetening capacity, or even by the corresponding equivalent of magnesium or sodium or potassium cyclamate. In addition, any of the constituents of any of the specific examples can be included in any of them at some other quantity within the respective range given for it hereinabove.

The very small amount of sodium that the user would consume if sodium cyclamate or saccharin soluble were used as the sweetening agent in any salt substitute composition of this invention would not be prohibitive. The potassium cyclamate is prepared by replacing the sodium salts used for making the sodium cyclamate by the corresponding potassium salt. Also, the magnesium cyclamate is prepared by replacing the calcium salts used for making calcium cyclamate by the corresponding magnesium salt.

The various compositions embraced by the invention provide a salt substitute that manifests a very readily acceptable saline taste such that the person on a salt-free diet would be pleased to use regularly. When used in cooking and baking, these new compositions do not decompose to yield decomposition products that adversely affect the flavor and quality of the comestibles.

The gluconates and other ingredients of these new salt substitute compositions contribute to mask the bitter after-taste that ordinarily occurs with poassium chloride, and enhance the effectiveness as well as the taste. The calcium gluconate, glutamate, and ascorbate overcome the undesirable effects of calcium deficiency so often experienced by persons on a salt-free diet, and provide a better physiological balance between potassium and calcium. The calcium cyclamate and the saccharin, in spite of their sweetness, enhance the saline taste of these compositions.

While the invention has been more fully explained by details of certain specific embodiments of it, it is understood that various modifications, substitutions, and additions, e.g. of other vitamins or therapeutic agents that will not interfere with the saline taste and physical properties, or even ground condiment, may be made in these compositions within the scope of the appended claims which are intended also to include equivalents of the specific embodiments.

What is claimed is:

1. A palatable and substantially sodium-free composition effective as a substitute for table salt and comprising from about forty-five to about ninety parts of potassium chloride, from about four and one-half to about twenty-three and one-half parts of potassium gluconate, from about four and one-half to about twenty-one and one-half parts calculated as calcium gluconate of a member of the class consisting of calcium gluconate and gluconic acid, from about five to about sixteen parts of potassium citrate, from about four to about fifteen parts calculated as calcium ascorbate of a member of the class consisting of calcium ascorbate and ascorbic acid, and a sweetening agent member of the class consisting of (a) from about 0.001 to about 0.02 percent calculated as calcium cyclamate of any of the calcium cyclamate, magnesium cyclamate, potassium cyclamate and sodium cyclamate, (b) from about 0.01 to about 0.2 percent of saccharin, and (c) from about 0.0001 to about 0.002 percent of saccharin soluble; from none to about one-quarter of a percent of a non-toxic thiamin salt; and from none to about nine and one-quarter parts of a member of the class consisting of calcium glutamate and glutamic acid.

2. A palatable and substantially sodium-free composition as claimed in claim 1, wherein the thiamin salt is thiamin hydrochloride.

3. A palatable and substantially sodium-free composition as claimed in claim 1, wherein the thiamin salt is thiamin nitrate.

4. A palatable and substantially sodium-free composition effective as a substitute for table salt and comprising each of the following ingredients in about the number of parts by weight respectively shown opposite it:

| | |
|---|---|
| Potassium chloride | 70.73 |
| Potassium gluconate | 7.5 |
| Calcium gluconate | 7.5 |
| Potassium citrate | 6.5 |
| Calcium ascorbate | 7.5 |
| Thiamin hydrochloride | Up to 0.25 |
| Calcium cyclamate | 0.001 to 0.02 |

5. A palatable and substantially sodium-free composition as claimed in claim 4, wherein the thiamin hydrochloride is replaced by some other non-toxic thiamin salt.

6. A palatable and substantially sodium-free composition as claimed in claim 4, wherein the calcium cyclamate is replaced by from about 0.01 to about 0.2 part of saccharin.

7. A palatable and substantially sodium-free composition as claimed in claim 4, wherein the calcium cyclamate is replaced by its equivalent in a member of the class consisting of magnesium, potassium, and sodium cyclamates.

References Cited in the file of this patent

UNITED STATES PATENTS

| | | |
|---|---|---|
| 1,874,055 | Liebrecht | Aug. 30, 1932 |
| 2,471,144 | Davy | May 24, 1949 |
| 2,570,272 | Pilcher | Oct. 9, 1951 |
| 2,764,485 | Bash et al. | Sept. 25, 1956 |
| 2,803,551 | Helgren | Aug. 20, 1957 |
| 2,860,995 | Sair | Nov. 18, 1958 |

FOREIGN PATENTS

| | | |
|---|---|---|
| 421,554 | Great Britain | Dec. 24, 1934 |
| 502,934 | Canada | May 25, 1954 |